Patented June 8, 1943

2,321,303

UNITED STATES PATENT OFFICE 2,321,303

COATING COMPOSITION

Edward H. McArdle, Linden, N. J., assignor to Standard Oil Development Company, a corporation of Delaware No Drawing. Application October 7, 1939,
Serial No. 298,401

5 Claims. (Cl. 106—311)

This invention relates to improvements in coating compositions and more particularly to coating compositions containing large volumes of volatile ingredients and at the same time having normal brushing viscosities.

When coating compositions, either clear varnishes or pigmented vehicles, are being applied, it is very desirable that a uniform layer of the coating composition be obtained. Properly to level this layer, it is desirable that the coating composition have a certain brushing viscosity. It is generally the practice to thin the coating composition by the addition of a hydrocarbon thinner. The thinners that were used to a great extent heretofore have been turpentine and petroleum spirits which evaporate at a rate similar to turpentine.

Such mineral spirits have been composed of small quantities of aromatic hydrocarbons together with larger proportions of naphthenes and paraffins.

The solvency of naphthene hydrocarbons has been generally considered to be half of that of the corresponding aromatic hydrocarbons. Paraffins have been generally considered to possess a solvency of about half of that of the corresponding naphthenes.

It is an object of this invention to provide a thinner that not only will dissolve the coating composition, but also will not reduce the brushing viscosity to the same degree as would be obtained were the same volumes of mineral spirits used.

The mineral spirits that were used heretofore, boiling in the mineral spirit range, that is, 300° to 400° F. and used for architectural paints, seldom have A. P. I. gravities higher than 50°. According to this invention, branched chain paraffinic hydrocarbons produced by reacting an olefin with a paraffinic hydrocarbon containing at least one tertiary carbon atom have the desired average boiling points as the thinners used heretofore and also an A. P. I. gravity of about 57°. If paints are thinned by weight, more volume of the branched chain paraffinic hydrocarbons are used. The branched chain paraffinic hydrocarbons used according to this invention shall hereafter be called "alkylates."

The boiling range of alkylates used according to this invention is between 300° and 400° F. The A. P. I. gravity may vary between 53° and 70°, and the aniline point between 160° and 195° F.

When a paint vehicle is thinned with conventional low solvency mineral spirits, the resulting viscosity is considerably lower than when the same weight of vehicle is thinned with the same corresponding weight of alkylates. Therefore, a greater weight of the alkylates can be used when thinning a paint to arrive at the same brushing viscosity. In the past, turpentine, having an A. P. I. gravity of 33°, had been very widely used, but as the mineral spirits of from 44° to 50° A. P. I. gravity have largely replaced the turpentine because of the fact that a greater volume of the mineral spirits may be used to obtain the same thin paint viscosity, it is evident that the thinner used according to this invention, having a still higher A. P. I. gravity, can be used to advantage to replace the mineral spirits of from 44° to 50° A. P. I. gravity. The following table illustrates the advantage obtained by using the alkylates:

Table 1

|  | Alkylates | Mineral spirits |
|---|---|---|
| Specific gravity | .752 | .783 |
| A. P. I. gravity degrees | 56.7 | 49.3 |
| 50½ off volatile point °F | 342 | 340 |

VISCOSITIES OF THINNED COATING COMPOSITIONS

| 50/50 by weight Beckasol #18. | 59 centipoises | 40 centipoises |
| 25 gal. ester-gum/China-wood oil-linseed oil; clear varnish thinned 50/50 by weight. | H/I (Gardner Holdt tubes at 25° C.) 166.5 centipoises at 100° F. (Ubbelohde tube). | G (Gardner Holdt tubes at 25° C.) 141.0 centipoises at 100° F. (Ubbelohde tube). |
| Same varnish 90 g.: white lead in oil 50 g. | 74.8 seconds (Ford Cut at 75° F. #4 Orifice). | 61.5 seconds. |
| White lead in oil 200 g. thinner alone 60 g. | 13.2 seconds (Ford Cup at 75° F. #4 Orifice). | 13.4 seconds. |

Where a white lead-in-oil paint or varnish is thinned with the same weights of mineral spirits of 50° A. P. I. gravity and alkylates, the difference in volume of the two thinners is illustrated as follows:

200 grams of white lead-in-oil paste is thinned with 60 g. of mineral spirits of 49.3° A. P. I. gravity to obtain a volume of 76.5 cc. of thinned paint. When the same weight of paste is thinned with 60 g. of the alkylate having a gravity of 56.7, 79.8 cc. of the thinned paint are obtained having the same brushing viscosity as the one thinned with mineral spirits; that is, 3.3 cc. or 4.3% additional volume of paint are obtained when the alkylate is used. When varnish vehicles are thinned, that is, a vehicle weighing 240 g. is thinned with 240 g. of mineral spirits, 310.4 cc. at 77° F. of a varnish are obtained; while where the same weight of alkylates are used, 325.0 cc.

at 77° F. of the thinned varnish are obtained, that is, 14.6 cc. or 4.7% more thinned varnish is obtained when the alkylates are used. Since the vehicle thinned with alkylates has a higher viscosity than that thinned with mineral spirits, still more alkylates can be incorporated to match the brushing viscosity of the mineral spirits varnish.

When a synthetic resin, of the type employed to increase durability of coating compositions, is thinned with equal weights of mineral spirits and alkylates, considerably greater volumes of alkylate may be added to obtain the same brushing viscosity.

I claim:

1. A coating composition comprising a nonvolatile varnish vehicle and a mixture of branched chain paraffinic hydrocarbons boiling between 300° and 400° F., an A. P. I. gravity of 53° to 70° and an aniline point between 160° and 195° F.

2. A coating composition comprising a pigment, a drying oil and a mixture of branched chain paraffinic hydrocarbons boiling between 300° and 400° F., an A. P. I. gravity of 53° to 70° and an aniline point between 160° and 195° F.

3. A coating composition comprising a drying oil, and 30 to 50% of a mixture of branched chain paraffinic hydrocarbons boiling between 300° and 400° F., having an A. P. I. gravity of 53 to 70° and an aniline point between 160° and 195° F.

4. A coating composition comprising an ester gum, China-wood oil, linseed oil, and 30 to 50% of a mixture of branched chain paraffinic hydrocarbons boiling between 300° and 400° F., having an A. P. I. gravity of 53 to 70° and an aniline point between 160° and 195° F.

5. A coating composition comprising a metal pigment, linseed oil, Chinawood oil and 30 to 50% of a mixture of branched chain paraffinic hydrocarbons boiling between 300° and 400° F., having an A. P. I. gravity of 53 to 70° and an aniline point between 160° and 195° F.

EDWARD H. McARDLE.